US008237571B2

(12) United States Patent
Wang et al.

(10) Patent No.: US 8,237,571 B2
(45) Date of Patent: Aug. 7, 2012

(54) ALARM METHOD AND SYSTEM BASED ON VOICE EVENTS, AND BUILDING METHOD ON BEHAVIOR TRAJECTORY THEREOF

(75) Inventors: Yuh-Ching Wang, Tainan (TW); Yu-Hsien Chiu, Kaohsiung (TW); Gwo Lang Yan, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 776 days.

(21) Appl. No.: 12/366,650

(22) Filed: Feb. 6, 2009

(65) Prior Publication Data
US 2010/0127878 A1 May 27, 2010

(30) Foreign Application Priority Data
Nov. 26, 2008 (TW) ................................ 97145799 A

(51) Int. Cl.
*G08B 23/00* (2006.01)
(52) U.S. Cl. ...................... 340/573.1; 340/540; 340/506; 348/143; 704/208; 704/270; 704/E21.001; 705/2
(58) Field of Classification Search .................. 704/246, 704/270, E21.001; 340/540, 506, 573.1; 348/143; 705/2
See application file for complete search history.

(56) References Cited

U.S. PATENT DOCUMENTS

| | | | | |
|---|---|---|---|---|
| 5,692,215 A | * | 11/1997 | Kutzik et al. ................... | 710/18 |
| 6,061,647 A | * | 5/2000 | Barrett .......................... | 704/208 |
| 6,211,787 B1 | * | 4/2001 | Yoshiike et al. ............ | 340/573.1 |
| 6,263,311 B1 | * | 7/2001 | Dildy ............................ | 704/273 |
| 6,313,743 B1 | * | 11/2001 | Abraham-Fuchs et al. .. | 340/505 |
| 6,518,889 B2 | * | 2/2003 | Schlager et al. ............ | 340/573.1 |
| 6,525,658 B2 | * | 2/2003 | Streetman et al. ............. | 340/522 |
| 6,532,360 B1 | * | 3/2003 | Shaffer ....................... | 455/404.1 |
| 6,796,799 B1 | * | 9/2004 | Yoshiike et al. .............. | 434/236 |
| 6,825,761 B2 | * | 11/2004 | Christ et al. ................... | 340/506 |
| 6,825,769 B2 | * | 11/2004 | Colmenarez et al. .......... | 340/575 |
| 6,907,397 B2 | * | 6/2005 | Kryze et al. ................... | 704/251 |
| 7,002,463 B2 | * | 2/2006 | Wakabayashi ................ | 340/522 |
| 7,009,497 B2 | * | 3/2006 | Nicoletti et al. ......... | 340/286.05 |
| 7,091,865 B2 | * | 8/2006 | Cuddihy et al. ............ | 340/573.1 |
| 7,171,357 B2 | * | 1/2007 | Boland ......................... | 704/231 |
| 7,421,369 B2 | * | 9/2008 | Clarkson ....................... | 702/150 |
| 7,586,418 B2 | * | 9/2009 | Cuddihy et al. ............ | 340/573.1 |

(Continued)

FOREIGN PATENT DOCUMENTS

JP 2001-236579 A 8/2001
(Continued)

*Primary Examiner* — Benjamin C Lee
*Assistant Examiner* — Quang D Pham
(74) *Attorney, Agent, or Firm* — Lin & Associates IP, Inc.

(57) ABSTRACT

Disclosed are an alarm method and system based on voice events, and a building method on behavior trajectory thereof. The system comprises a signal sensor, a voice-event detector and notice and alarm element. In the method, voice signals are captured from a remote unit in an environment. The captured voice signals are classified into at least a voice event. As such, an emergent-event notice is automatically transmitted out if one of predefined emergent events is detected. In the building method on behavior trajectory, messages on voice events are continuously recorded. When the number of the recorded voice events reaches a threshold, a behavior trajectory is constructed, in which a behavior consists of two or more voice events or a single voice event.

23 Claims, 11 Drawing Sheets

U.S. PATENT DOCUMENTS

| | | | |
|---|---|---|---|
| 7,589,637 B2* | 9/2009 | Bischoff et al. | 340/573.1 |
| 7,755,493 B2* | 7/2010 | Berenguer et al. | 340/573.1 |
| 7,937,461 B2* | 5/2011 | Kutzik et al. | 709/224 |
| 8,155,964 B2* | 4/2012 | Hirose et al. | 704/260 |
| 2002/0002460 A1* | 1/2002 | Pertrushin | 704/270 |
| 2002/0035475 A1* | 3/2002 | Yoda | 704/270 |
| 2002/0138255 A1* | 9/2002 | Endo et al. | 704/208 |
| 2002/0165733 A1* | 11/2002 | Pulkkinen et al. | 705/2 |
| 2003/0027547 A1* | 2/2003 | Wade | 455/404 |
| 2003/0052789 A1* | 3/2003 | Colmenarez et al. | 340/575 |
| 2003/0096590 A1* | 5/2003 | Satoh | 455/404 |
| 2003/0117279 A1* | 6/2003 | Ueno et al. | 340/523 |
| 2003/0151513 A1* | 8/2003 | Herrmann et al. | 340/573.1 |
| 2004/0083107 A1* | 4/2004 | Noda et al. | 704/270 |
| 2004/0113794 A1* | 6/2004 | Schlager et al. | 340/573.1 |
| 2004/0127241 A1* | 7/2004 | Shostak | 455/500 |
| 2005/0007255 A1* | 1/2005 | Morris | 340/693.5 |
| 2005/0110632 A1* | 5/2005 | Berezowski et al. | 340/521 |
| 2005/0114118 A1* | 5/2005 | Peck | 704/208 |
| 2005/0195079 A1* | 9/2005 | Cohen | 340/539.12 |
| 2005/0275541 A1* | 12/2005 | Sengupta et al. | 340/573.1 |
| 2006/0067545 A1* | 3/2006 | Lewis et al. | 381/124 |
| 2006/0067546 A1* | 3/2006 | Lewis et al. | 381/124 |
| 2006/0077063 A1* | 4/2006 | Cheng et al. | 340/573.1 |
| 2006/0258328 A1* | 11/2006 | Godoy | 455/404.1 |
| 2006/0267780 A1* | 11/2006 | Adams | 340/573.1 |
| 2007/0024451 A1* | 2/2007 | Albert | 340/573.1 |
| 2007/0057798 A1* | 3/2007 | Li et al. | 340/573.1 |
| 2007/0085695 A1* | 4/2007 | Nerurkar | 340/692 |
| 2007/0096927 A1* | 5/2007 | Albert | 340/573.1 |
| 2007/0164872 A1* | 7/2007 | Monroe | 340/574 |
| 2007/0299473 A1* | 12/2007 | Matos | 607/5 |
| 2008/0068158 A1* | 3/2008 | Sumiyoshi et al. | 340/540 |
| 2008/0152122 A1* | 6/2008 | Idan et al. | 379/265.07 |
| 2008/0169932 A1* | 7/2008 | Desrosiers et al. | 340/573.1 |
| 2008/0174439 A1* | 7/2008 | Wong et al. | 340/573.1 |
| 2008/0249779 A1* | 10/2008 | Hennecke | 704/270 |
| 2009/0051524 A1* | 2/2009 | Lim et al. | 340/501 |
| 2009/0082699 A1* | 3/2009 | Bang et al. | 600/595 |
| 2009/0089089 A1* | 4/2009 | Jang et al. | 705/2 |
| 2009/0146813 A1* | 6/2009 | Nuno | 340/572.1 |
| 2009/0226043 A1* | 9/2009 | Angell et al. | 382/115 |
| 2009/0290689 A1* | 11/2009 | Watanabe et al. | 379/88.01 |
| 2010/0060448 A1* | 3/2010 | Larsen et al. | 340/539.15 |
| 2010/0090834 A1* | 4/2010 | Buchnick et al. | 340/573.1 |
| 2010/0286490 A1* | 11/2010 | Koverzin | 600/301 |
| 2011/0035213 A1* | 2/2011 | Malenovsky et al. | 704/208 |

FOREIGN PATENT DOCUMENTS

| | | |
|---|---|---|
| JP | 2002-133558 A | 5/2002 |
| JP | 2002-183859 A | 6/2002 |
| JP | 2003-177775 A | 6/2003 |
| JP | 2006-141679 A | 6/2006 |
| TW | 588840 | 5/2004 |
| TW | 200737056 | 10/2007 |

* cited by examiner

| Type Letter For Voice Event | Event Type |
|---|---|
| A | Fall/Trip |
| B | Cry/Cry For Pain |
| C | Moan/Murmur |
| D | Argue |
| E | Cry For Help/Shout |
| F | Stool |
| G | Urinate |
| H | Flush Toilet |
| I | Turn On/Off Faucet |
| J | Wash Hand |
| K | Walk/Move |
| L | Open/Close Door |
| M | Choke When Drinking |
| N | Object Drops |
| O | Get In/Off Bed |
| P | Get In/Off Wheelchair |
| Q | Drink Water |
| R | Life/Replace Toilet Seat |
| S | Sit On Toilet Seat |
| T | Leave The Toilet |

FIG. 7a

| Voice Event Sequence | Voice Event Letter Sequence For Representing Voice Event Sequence |
|---|---|
| E1 | CBE...LABE...KL...GHIJIKL |
| E2 | OKKKLRSFTHIJIIJ |
| ... | ... |
| EN | MIIJPQSFTHIJIKKLLOAC |

FIG. 7b

ALARM METHOD AND SYSTEM BASED ON VOICE EVENTS, AND BUILDING METHOD ON BEHAVIOR TRAJECTORY THEREOF

FIELD OF THE INVENTION

The present invention generally relates to an alarm method and system based on voice events, and a building method on behavior trajectory thereof.

BACKGROUND OF THE INVENTION

The recent popularity of home-caring gradually embraces and integrates the information and communication technology (ICT) into the related caring services for cost reduction. Several alarm systems using ICT are deployed for the elderly living alone. The alarm systems are categorized into different types. For example, one type is the nursing call system used at the medical facilities. When the patient needs assistance, the nursing call button is pressed to notify the nurse at the nurse station. The other type is the emergency call button used in the general home caring system. In such type of alarm system, a button or a string is provided so that when a patient needs assistance, the patient may either press the button or pull the string to send the message, usually a bell or buzz.

Taiwan Patent Publication No. 200737056 disclosed a fall emergency reporting device to detect a fall event through the device angle and the device still time, and immediately send the SOS message with the identification code to the other fall emergency reporting devices in the group to take emergency steps. Taiwan Patent Issue No. 588840 disclosed a personal alarm device using dial-in or wireless activation, or using live audio sound and dialogue contents to be transmitted wirelessly to the emergency wireless transmitter at the control center.

In addition, U.S. Pat. No. 6,518,889 disclosed a voice-activated personal alarm to detect a certain set of vocabulary, such as HELP, and send the GPS-like location information.

The conventional alarm technology has yet found to detect the non-voluntary voice or the sound of the human-environment interaction, and then send the voice event to realize the alarm technology capable of active alarming of dangerous events or scenario-inferred abnormal behaviors.

SUMMARY OF THE INVENTION

The disclosed exemplary embodiments of the present invention may provide an alarm method and system based on voice events.

In an exemplary embodiment, the disclosed relates to an alarm method based on voice events, applicable to a specific living space. The method may comprise: capturing a voice signal in an environment where a remote device is located; classifying the captured voice signal into at least a voice event through a voice event detection method; and automatically issuing alarm message when the at least one voice event is a pre-defined emergency event.

In another exemplary embodiment, the disclosed relates to a behavior trajectory building method based on voice events, comprising: continuously detecting a latest voice event and continuously recording the detected voice events through an event detection method; naming the continuously detected voice events with letters to obtain a plurality of letter sequences representing voice events; comparing the letter sequences in a pair-wise manner to find a plurality of the identical strings; computing the probability and the length of the plural identical strings and setting threshold for the probability and the length to obtain the matching pre-selected strings; classifying the pre-selected strings, with each type representing a behavior type, through a classification method; and inducing the matching pre-defined strings for each type to establish a behavior trajectory.

Yet in another exemplary embodiment, the disclosed relates to an alarm system based on voice events, comprising a signal sensor for capturing at least one voice signal externally inputted and outputting the sensed signal and recording its location; a voice event detector connected to the signal sensor and based on at least a characteristic parameter of the sensed signal and the location to determine a corresponding plural voice events; and a notice and alarm element connected to the voice event detector and based on the plural voice events to execute the notification and alarming functions.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 7a shows an exemplar of naming voice events with letters, consistent with certain disclosed embodiments of the present invention.

FIG. 7b shows an exemplar of event letter sequence, consistent with certain disclosed embodiments of the present invention.

DETAILED DESCRIPTION OF THE PREFERRED EMBODIMENTS

The present invention is based on voice events to actively detect whether the person under care is under any danger, and may issue alarm messages when emergency occurs. The present invention also designs an alarm mechanism and a behavior trajectory mechanism. An exemplary embodiment of the present invention discloses an alarm method based on voice events.

Figure 1:
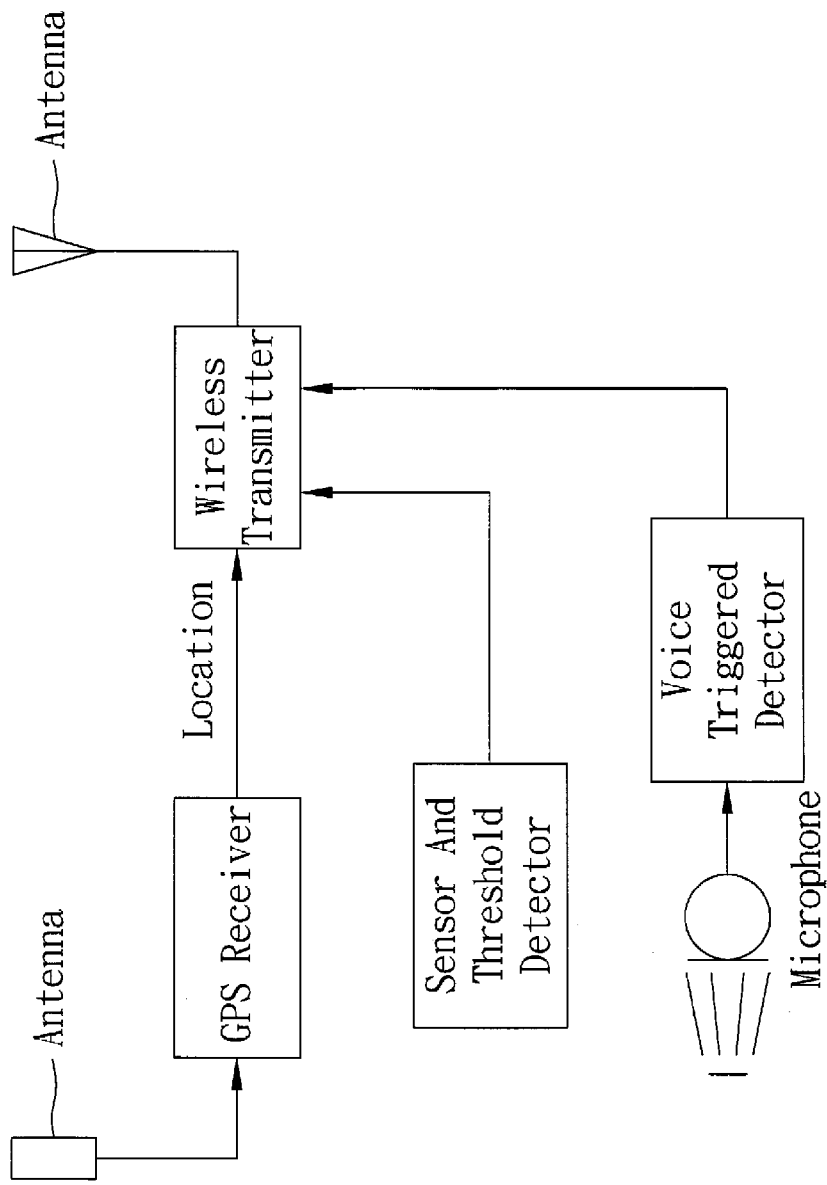
FIG. 1 shows an exemplary schematic view of a portable voice detection device.
Figure 2:
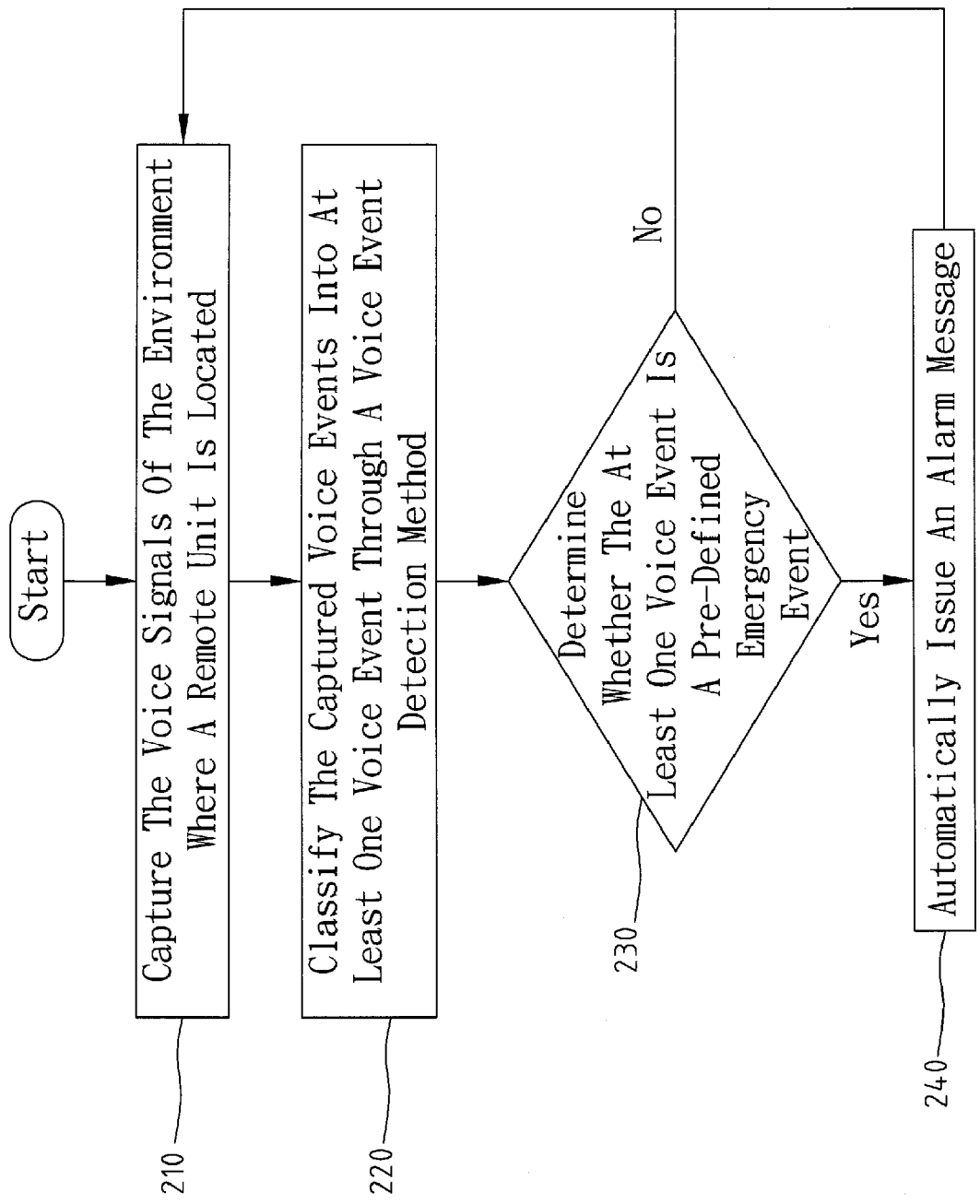
FIG. 2 shows an exemplary flowchart illustrating an alarm method based on voice events, consistent with certain disclosed embodiments of the present invention.

FIG. 2 shows an exemplary flowchart illustrating an alarm method based on voice events, consistent with certain disclosed embodiments of the present invention. The alarm method is applicable to a specific living space, such as bedroom, living room, bathroom in a house, hospital room, or other types of closed living space. Referring to FIG. 2, the voice signals of the environment where a remote unit is located are captured, as shown in step 210. Through a voice event detection method, the captured voice events may be classified into at least one voice event, as shown in step 220.

Then, step 230 is to determine whether the at least one voice event is a pre-defined emergency event. If so, an alarm message is automatically issued, as shown in step 240; otherwise, return to step 210. In other words, when the voice event is a pre-defined emergency event, an alarm message is automatically sent.

In step 210, the remote unit may be in an environment, such as, in bed, bedside, corridor, living room, kitchen, staircase, bathroom, restroom, toilet area, or the area surrounding the wheelchair.

In step 220, a voice event may be either ordinary voice event or emergency event, where emergency event is a voice event triggered by pre-defined emergency situations, such as, falling during getting in or off bed, falling during getting or off wheelchair, trip or slip when walking, choking when drinking, temporarily stopping breathing, fight or argument, crying or moaning, calling or calling for help, sudden illness attack, wrecking, breaking or falling object, unable to finish the use of toilet, and entering a dangerous zone. The ordinary voice event is a voice event triggered by ordinary voices, such as walking or movement, getting in or off bed, getting in or off wheelchair, opening or closing door, using faucet, using toilet, flushing toilet, drinking water, and so on.

In step 230, the voice-triggered emergency events may be falling during getting in or off bed, falling during getting or off wheelchair, trip or slip when walking, choking when drinking, temporarily stopping breathing, fight or argument, crying or moaning, calling or calling for help, sudden illness attack, wrecking, breaking or falling object, unable to finish the use of toilet, and entering a dangerous zone. The possible voice to trigger emergency events may include the involuntary meaningless human voice, or a meaning voice of a human bumping into the wall, floor or other objects. In step 240, the alarm message may be sent through different ways, such as through voice, light, monitor display or vibration.

Figure 3:
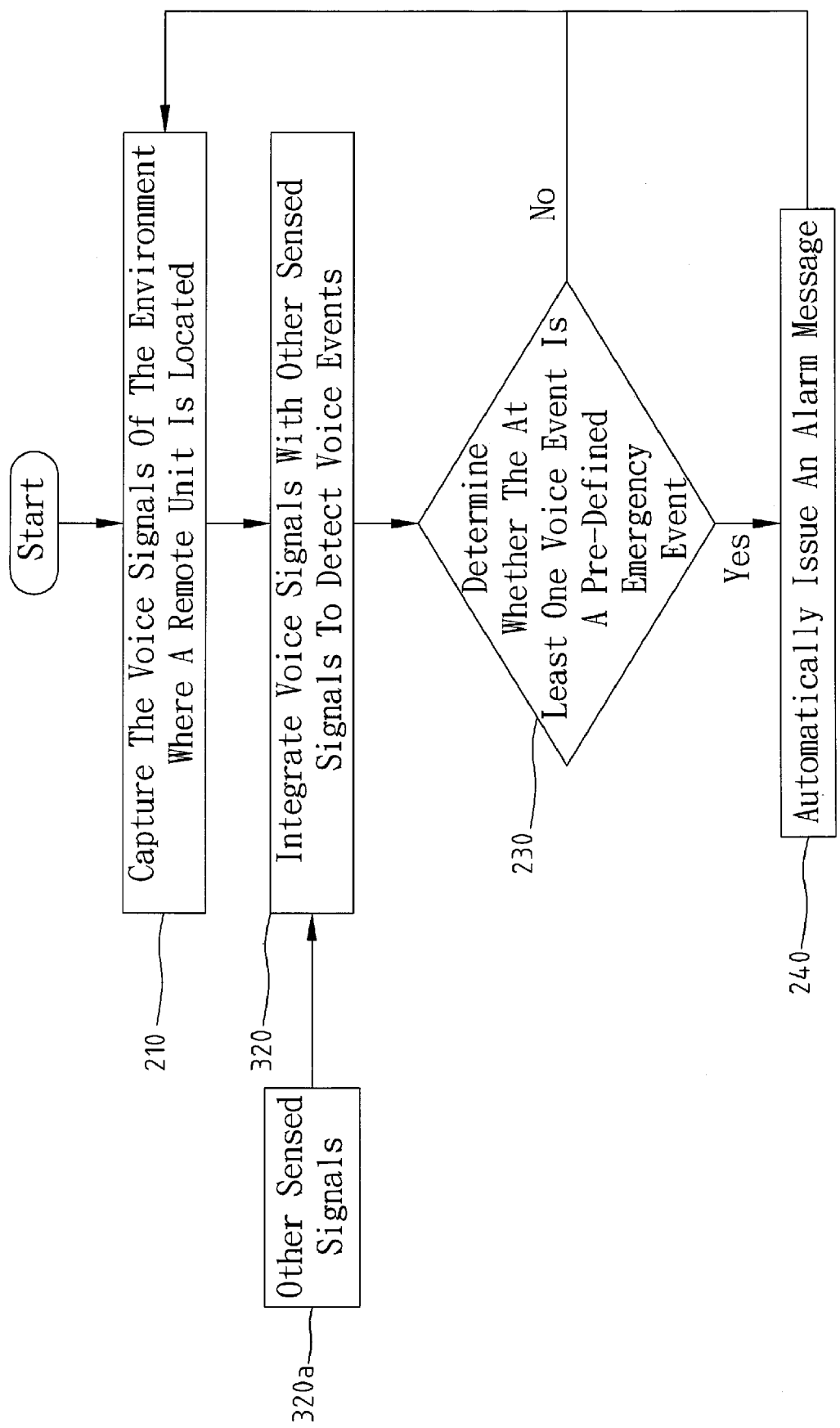
FIG. 3 shows an exemplary flowchart further illustrating the alarm method based on voice events, consistent with certain disclosed embodiments of the present invention.

According to the present invention, the exemplary embodiment of FIG. 2 may be further integrated with voice signal and other types of sensing signals to detect voice events, continuously record the detected voice events, and issue the alarm message in an emergency event, as shown in the exemplary flowchart of FIG. 3. The difference between FIG. 2 and FIG. 3 is step 320, where the voice signals and other types of sensing signals 320a are integrated to detect voice events.

Figure 4:
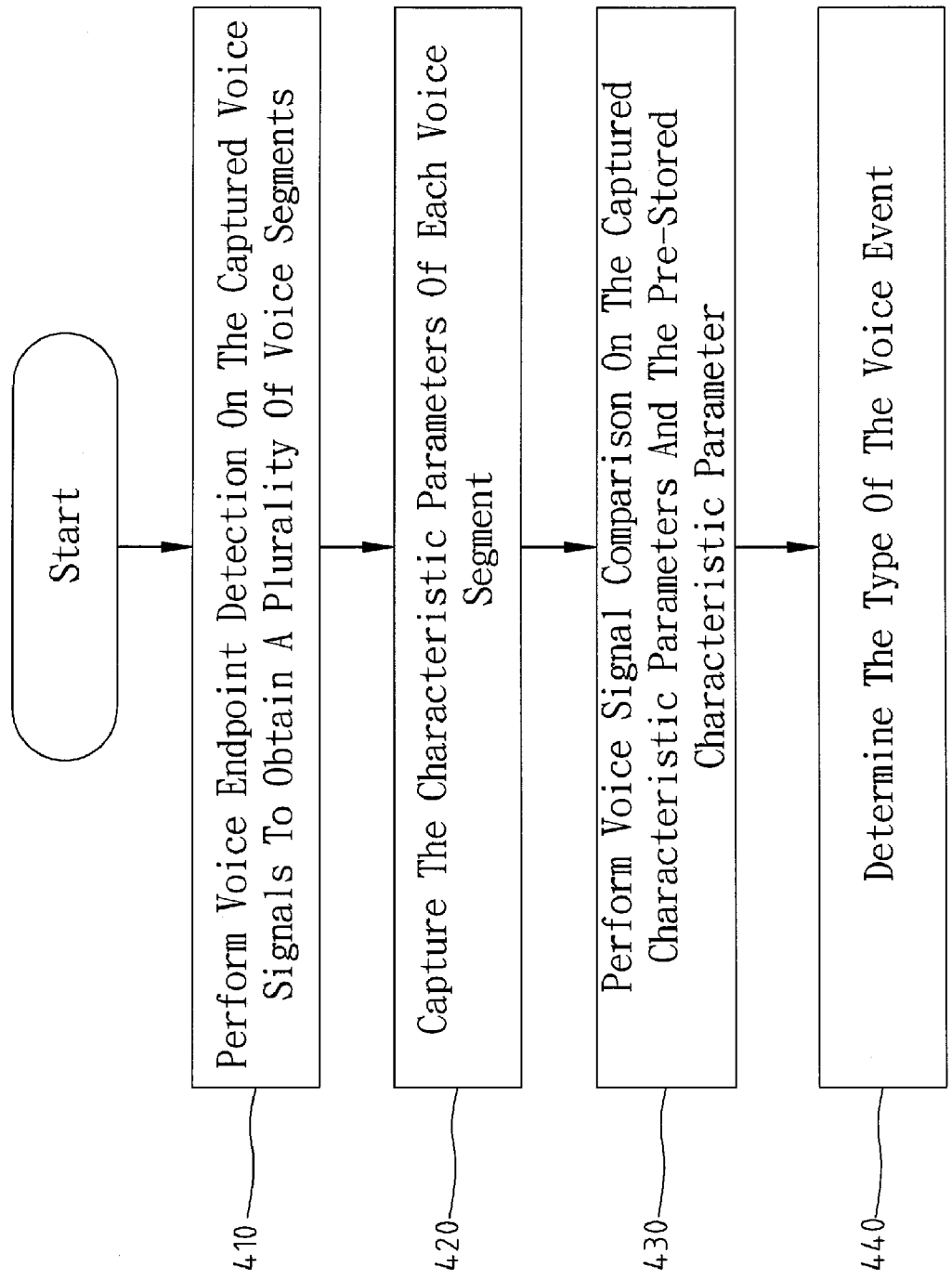
FIG. 4 shows an exemplary flowchart illustrating a voice event detection method, consistent with certain disclosed embodiments of the present invention.

FIG. 4 shows an exemplary flowchart illustrating a voice event detection method, consistent with certain disclosed embodiments of the present invention. As shown in FIG. 4, step 410 is to perform voice endpoint detection on the captured voice signals to obtain a plurality of voice segments. In step 420, the characteristic parameters of each voice segment are captured. Then, voice signal comparison on the captured characteristic parameter and the pre-stored characteristic parameter is performed (step 430) to determine the type for a voice event (step 440).

In step 410, the voice endpoint may be determined by volume, zero crossing rate, spectrum variance or spectrum entropy. In step 420, the characteristic parameter may be selected from the following: formants, linear prediction coefficient (LPC), Cepstral coefficient, Mel FCC (MFCC) and perceptual LPC.

In step 430, the voice signal comparison may adopt signal pattern comparison, such as dynamic time warping, or statistic model comparison, such as Hidden Markov Model (HMM).

The voice event detection method may further include the emergency event detection based on series of voice events. For example, a series of bumping voice followed by crying or moaning voice may be determined to be a "possible falling" emergency event.

The following describes several examples of the integration of voice signals and other types of sensing signals to determine the event. For example, the integration of the voice in the area surrounding the toilet and the pressure change on the toilet seat can be used to determine an emergency event. That is, when the pressure on the toilet seat is off and a bumping voice to the floor occurs in the area surrounding the toilet may be identified as a "possible falling" emergency event. The integration of the voice detection and the pressure sensor on the toilet seat may be used to determine the "using toilet" event. The integration of the flushing voice and the pressure sensor installed on the toilet flush button/handle may be used to determine the "toilet flushing" event. The integration of hand-washing voice and the sensor installed at the faucet may be used to determine the "hand-washing" event. The integration of object stepping on floor voice and the pressure sensor installed on the floor around the bed may be used to determine the "getting off bed" event. The integration of object stepping on the floor and the ultrasonic sensor installed on the ceiling may be used to determine the "falling" event.

The series of identified events may be further used to determine the advanced events. For example, the "using toilet" event, "toilet flushing event" and the "hand-washing" event may be determined as an advanced event, "using the restroom".

Figure 5:
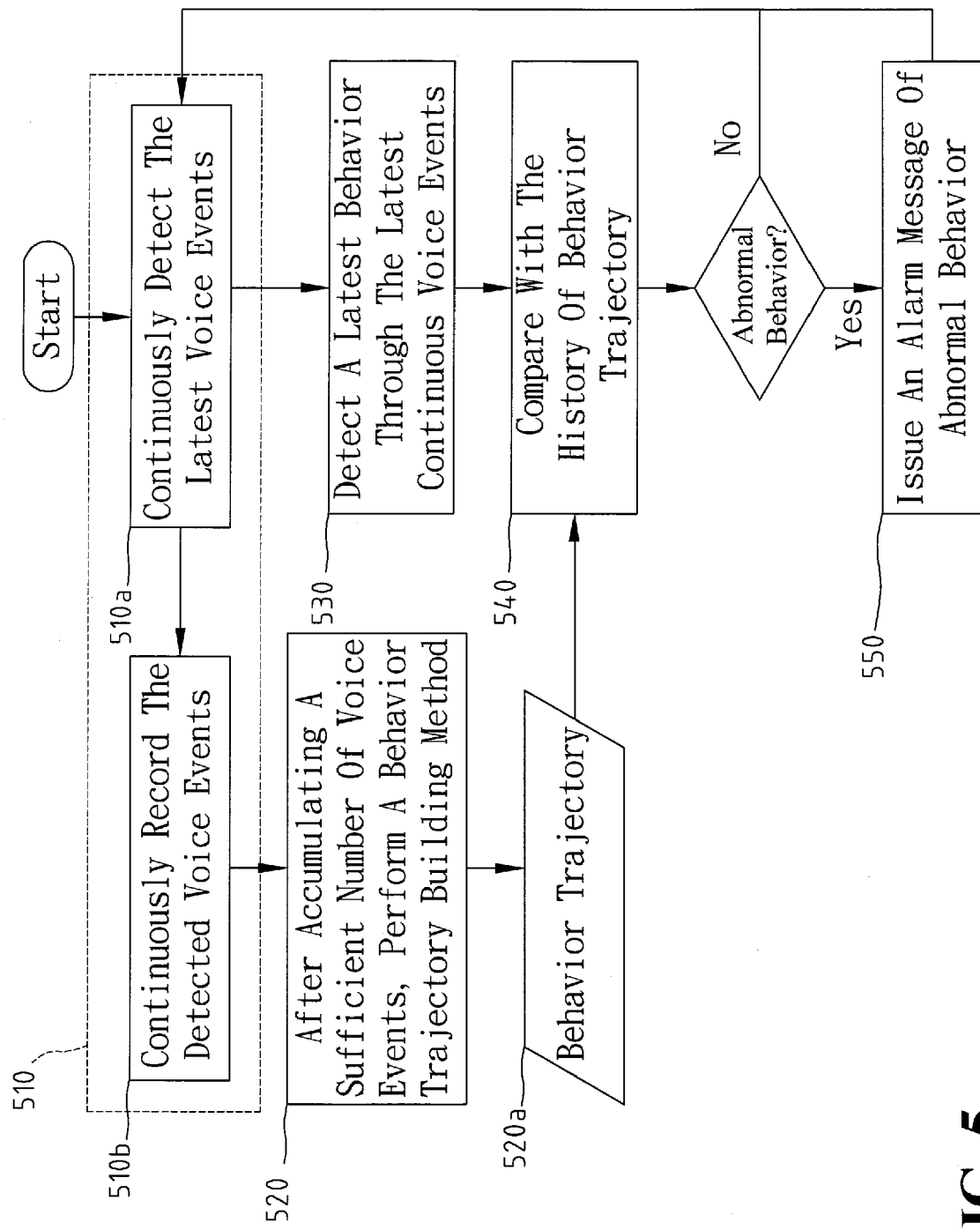
FIG. 5 shows an exemplary flowchart illustrating an abnormal behavior decision, consistent with certain disclosed embodiments of the present invention.

According to the present invention, the alarm method based on voice events may further include a method for deciding abnormal behavior to continuously determine whether the latest behavior is an abnormal behavior. FIG. 5 shows an exemplary flowchart illustrating an abnormal behavior decision, consistent with certain disclosed embodiments of the present invention. As shown in FIG. 5, the abnormal behavior decision method uses the voice event detection method (step 510), to continuously detect the latest voice event (step 510a) and continuously record the detected voice event (step 510b). After accumulating a sufficient number of voice events, the abnormal behavior decision method generates a behavior trajectory 520a through a behavior trajectory building method (step 520). Then, the abnormal behavior decision method uses the latest continuous voice events to detect the latest behavior (step 530), compares with the history of behavior trajectory (step 540), and issues an alarm message of abnormal behavior (step 550) when detecting an abnormal behavior.

In addition to detecting the latest voice event, step 510a may also include the detection of the time and location of the latest voice event. Similarly, in addition to recording the latest voice events, step 510a may also record the time and location of the detected voice event. In step 520, a behavior may be constituted by single voice event or two or more voice events. In the exemplary embodiments of the present invention, the determination of abnormal behavior may be based on the time, location, duration and frequency of the voice event. For example, a person under care usually spent 5 minutes in an "using the restroom" event according to the past recorded voice events. One day, this person spent 20 minutes to complete the "using the restroom" event. In this scenario, through the abnormal behavior decision method, an abnormal behavior is determined, and an abnormal behavior alarm message is issued to the care-giver.

Figure 6:
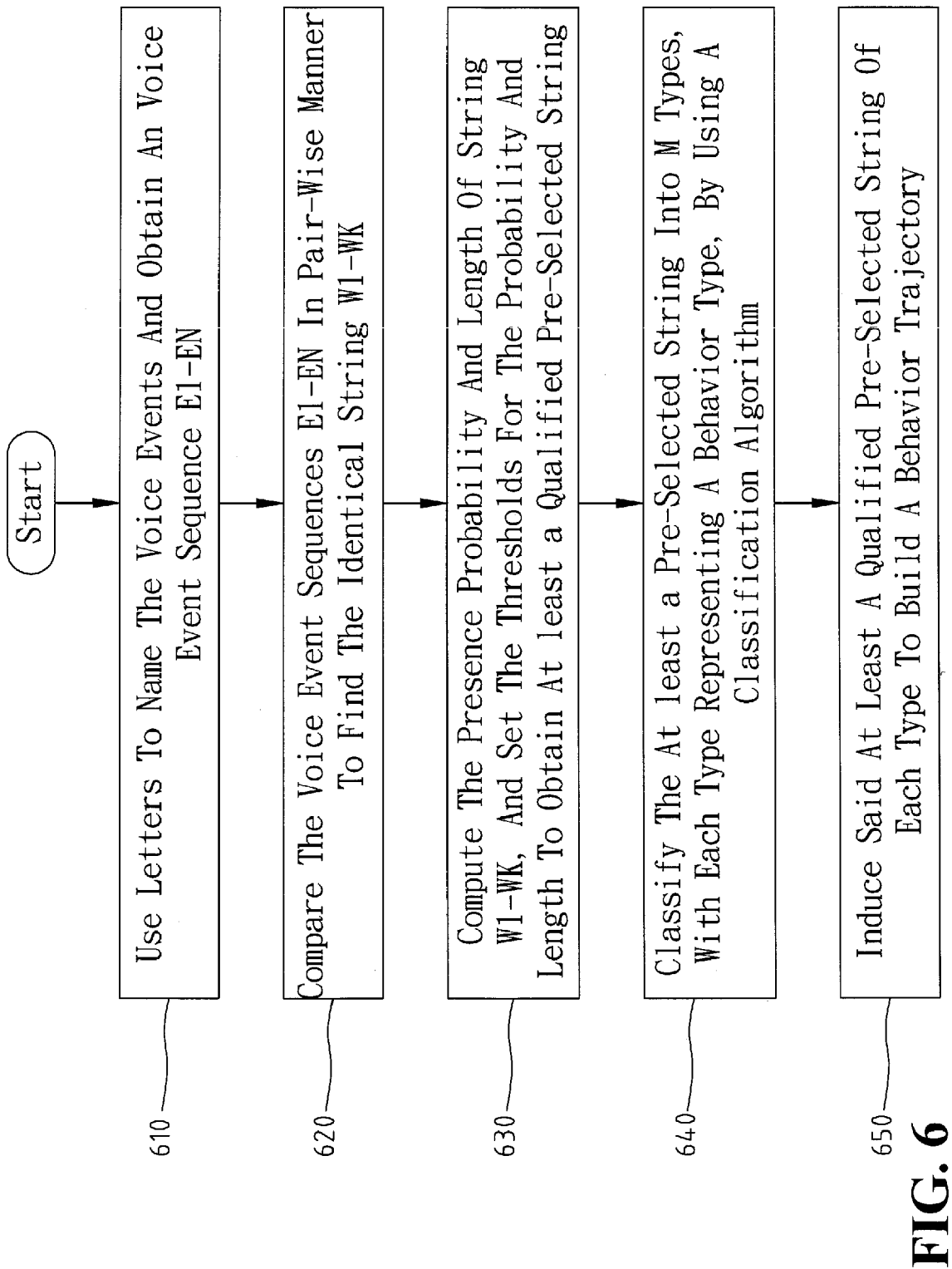
FIG. 6 shows an exemplary flowchart illustrating a behavior trajectory building method, consistent with certain disclosed embodiments of the present invention.

Hence, after voice event detection method (step 510), including the step of continuously detecting latest voice event (step 510*a*) and recording the latest detected voice event (step 510*b*), FIG. 6 shows an exemplary flowchart illustrating a behavior trajectory building method, consistent with certain disclosed embodiments of the present invention. As shown in FIG. 6, the behavior trajectory building method uses letters to name the voice events and obtains an voice event sequence E1-EN (step 610). Then, the voice event sequences E1-EN is compared in pair-wise manner to find the identical string W1-WK (step 620). Step 630 is to compute the presence probability and length of string W1-WK, and set the thresholds for the probability and length to obtain the qualified pre-selected string. In step 640, the pre-selected strings are further classified into M types, with each type representing a behavior type, via a classification algorithm. Finally, step 650 is to induce from the qualified pre-selected string of each type and establish a behavior trajectory.

In step 640, the classification algorithm may be k-means algorithm, Fuzzy c-means algorithm, quality threshold clustering algorithm, locality sensitivity hashing (LSH) algorithm, decision tree algorithm or Bayesian probability classification algorithm.

FIG. 7*a* and FIG. 7*b* show a working example of step 610, consistent with certain disclosed embodiments of the present invention. In FIG. 7*a*, the 20 types of voice events are named with letters A-T. In FIG. 7*b*, each voice segment is divided into a plurality of sub-segments, with each sub-segment corresponding to a voice event type of FIG. 7*a*, thus, corresponding to a letter. In other words, each voice segment represents a voice event sequence Ei. If there are N voice segments, there will be N voice event sequences E1-EN, and the voice events of each sequence correspond to letters shown in FIG. 7*b*. In FIG. 7*b*, the N voice event sequences E1-EN are compared pair-wise to find the identical string, such as HIJI.

Figure 8:
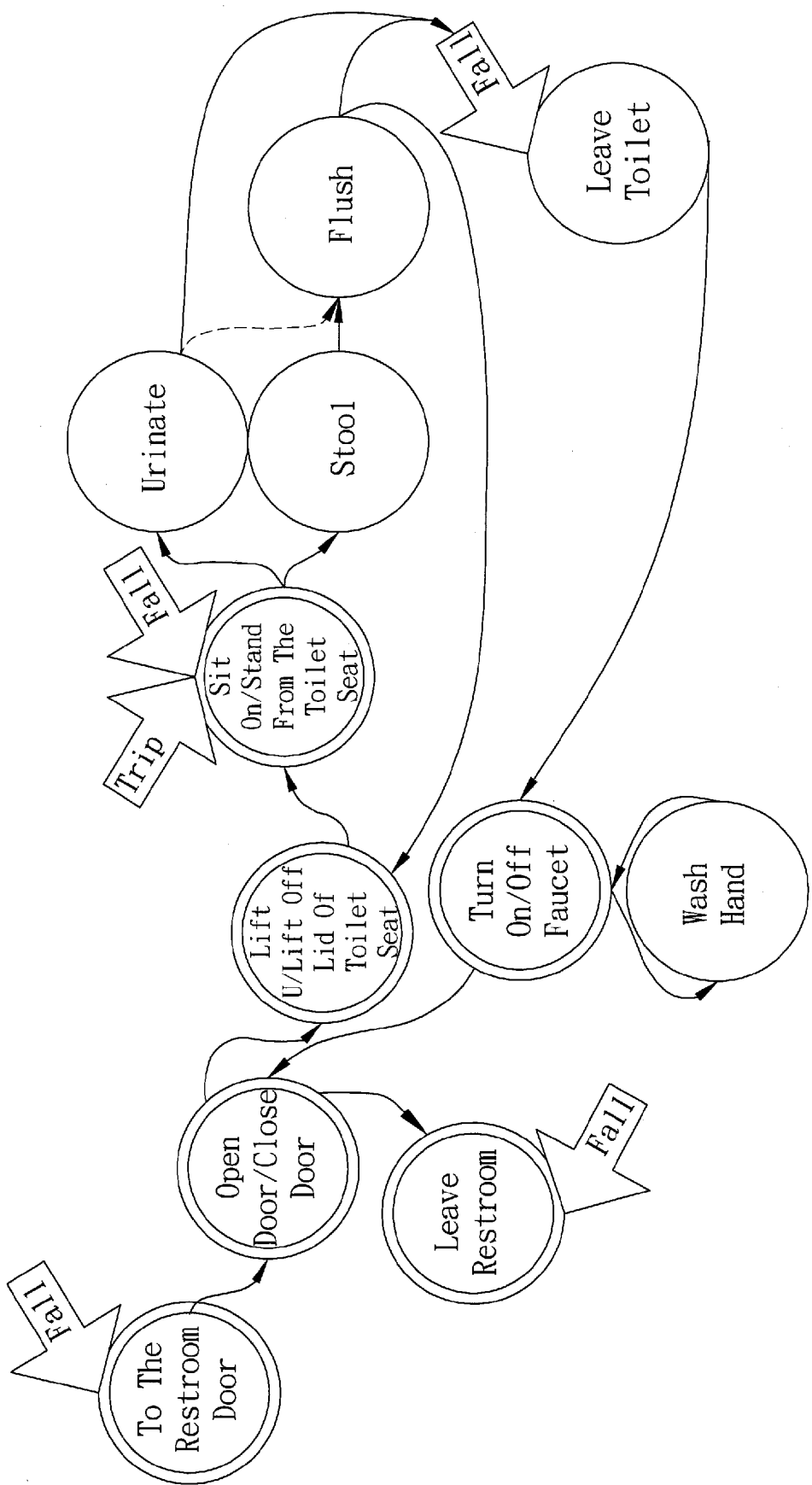
FIG. 8 shows a working example of the behavior trajectory built by the behavior trajectory building method, consistent with certain disclosed embodiments of the present invention.

FIG. 8 shows a schematic view of an exemplary behavior trajectory of FIG. 7*b* built by the behavior trajectory building method, consistent with certain disclosed embodiments of the present invention.

Figure 9:
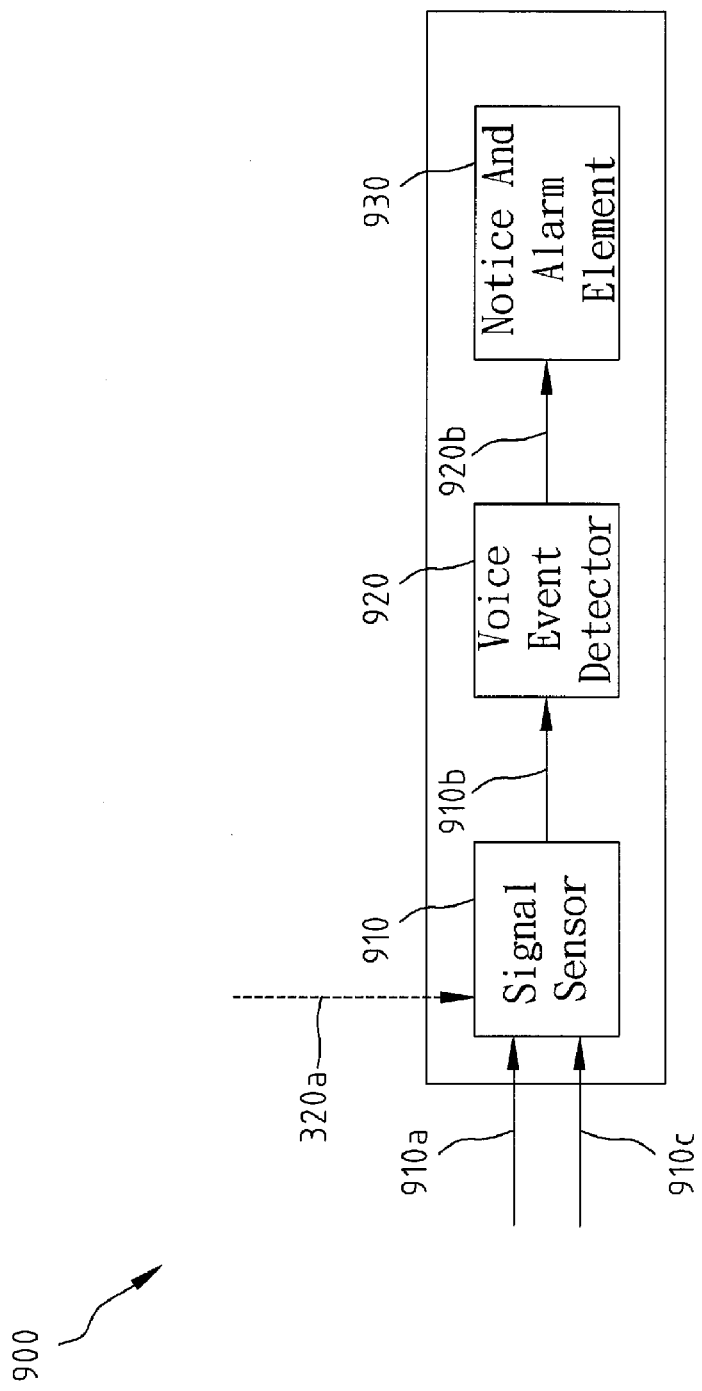
FIG. 9 shows an exemplary schematic view of an alarm system based on voice events, consistent with certain disclosed embodiments of the present invention.

In another exemplary embodiment, the present invention may provide an alarm system based on voice events, applicable to a specific living space, such as bathroom, hospital room, household bedroom and living room. As shown in FIG. 9, alarm system 900 comprises a signal sensor 910, a voice event detector 920 and a notice and alarm element 930. Signal sensor 910 captures one or more externally input voice signals 910*a*, and outputs sensed signal 910*b* and records its location 910*c*. Voice event detector 920 is connected to signal sensor 910, and is based on at least a characteristic parameter of sensed signal 910*b* and location 910*c* to determine messages 920*b* corresponding to a plurality of voice events. Notice and alarm element 930 is connected to voice event detector 920, and is based on the messages corresponding to the plurality of voice events to execute the notification and alarming, such as using voice output device, light output device, monitor display or vibration device to send emergency alarm message.

Alarm system 900 may be integrated with a plurality of devices, such as toilet, bed mattress, wheelchair, door, or window. Through such integration, signal sensor 910 may capture other sensed signals, described in the following examples.

For example, alarm system 900 may be integrated with a toilet, and signal sensor 910 may also capture the pressure signal of the toilet seat or the flushing signal of the flush switch of the toilet. Or, alarm system 900 can be integrated with a mattress, and signal sensor 910 may capture the pressure signal, switch signal, temperature signal, humidity signal, or physiological signal triggered by the human or object on the mattress. Or, alarm system 900 may be integrated with a faucet, and signal sensor 910 may capture the pressure signal and the switch signal triggered by the faucet switch. Or, alarm system 900 may be integrated with a wheelchair, and signal sensor 910 may capture the pressure signal or switch signal triggered by the cushion, wheel or brake switch. Or, alarm system 900 may be integrated with a door or window, and signal sensor 910 may capture the pressure signal and the switch signal triggered by the opening and closing of the door or window. Or, alarm system 900 may be integrated with a ceiling, and signal sensor 910 may capture the distance-measuring signal of the ultrasonic sensor installed on the ceiling.

With the aforementioned integration with other devices, alarm system 900 may use the voice signal and the other captured signals 320*a* to determine an emergency event. For example, after integration with a toilet, alarm system 900 may use voice and the pressure change on the toilet seat to determine an emergency event. When the pressure on the toilet seat lasts over an extended period of time and the voice around the toilet area indicates the trial to use force, an "unable to get up from the toilet" emergency event may be detected. For example, after integration with the ceiling above the toilet, alarm system 900 may use the voice and the ultrasonic distance-measuring signal from the ceiling to determine an emergency event. When voice around the toilet area indicates object landing on floor and the ultrasonic distance-measuring signal is computed to indicate a possible falling on the floor, a "possible falling" emergency event is detected.

Figure 10:
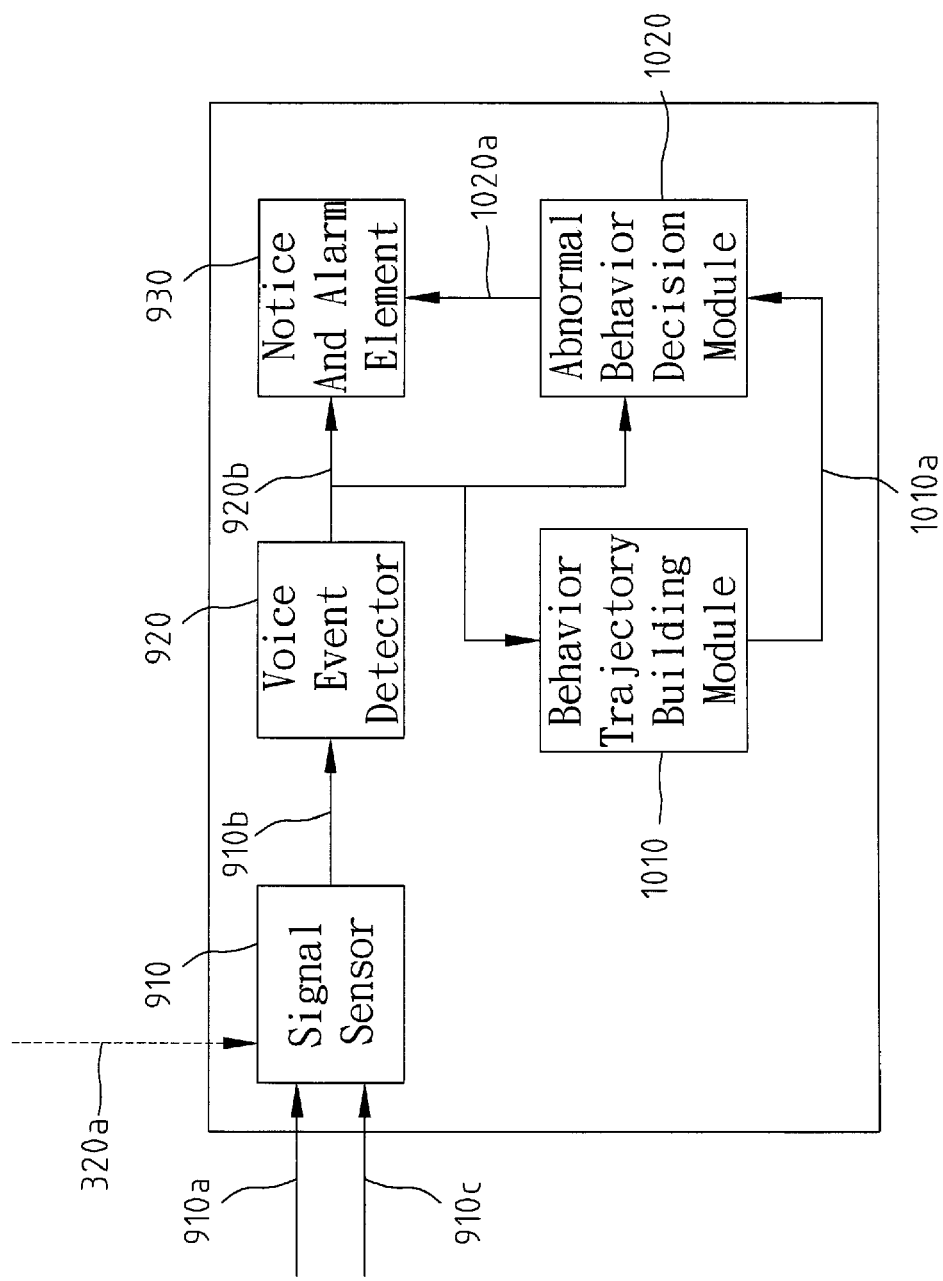
FIG. 10 shows another exemplary schematic view of an alarm system based on voice events, consistent with certain disclosed embodiments of the present invention.

The aforementioned abnormal behavior decision method and the behavior trajectory building method may be realized with modules or software, and integrated into alarm system 900. In another exemplary embodiment, the present invention may provide an alarm system based on voice events, as shown in FIG. 10. Alarm system 1000 comprises a signal sensor 910, a voice event detector 920, and a notice and alarm element, as well as a behavior trajectory building module 1010 or an abnormal behavior decision module 1020.

Voice event detector 920 may be connected to behavior trajectory building module 1010 and abnormal behavior decision module 1020, respectively, and provide the determined messages corresponding to the plurality of voice events to behavior trajectory building module 1010 and abnormal behavior decision module 1020. As shown in FIG. 10, behavior trajectory building module 1010 continuously records the voice event messages. After accumulating a sufficient number of recorded events, behavior trajectory building module 1010 may induce a behavior trajectory 1010*a*, where a behavior may consist of a single voice event or two or more voice events, depending on the parameters of the voice events, such as, probability or the number of. Abnormal behavior decision module 1020 continuously detects the latest behavior and compares with the history of behavior trajectory. When an abnormal behavior is detected, an abnormal behavior alarm message 1020*a* is issued. The decision of an abnormal behavior may be determined by the parameters, such as time, location, order, duration, frequency of the behavior.

In summary, the exemplary embodiments of the present invention disclose an alarm method and system based on voice events, a building method for behavior trajectory. The alarm mechanism is applicable to a specific living space to detect emergency event and abnormal behavior and actively issue notification and alarm messages. Through the integration with other devices, the alarm system may determine emergency events via the voice signal and other types of sensed signals. The voice triggering emergency events may be involuntary meaningless human voices, or meaningful voices indicating bumping of human into wall, floor or other objects.

Although the present invention has been described with reference to the exemplary disclosed embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An alarm method based on voice events, said method comprising:
   capturing a plurality of voice signals and sensing other sensed signals of an environment where a remote unit is located;
   integrating the captured voice signals and the other sensed signals into at least a voice event by using a voice event detection method;
   continuously detecting voice events through said voice event detection method and continuously recording the detected voice events;
   generating a behavior trajectory through a behavior trajectory building method after accumulating a sufficient number of the detected voice events;
   detecting a latest behavior through latest continuous voice events and comparing said latest behavior with a history of said behavior trajectory; and
   issuing a notification alarm message when an abnormal behavior is detected;
   wherein said behavior trajectory is generated by said behavior trajectory building method based on classifying qualified pre-selected strings of letters into a plurality of behavior types for building said behavior trajectory, said qualified pre-selected strings of letters being determined by naming each of the voice events with a letter to form letter sequences for the continuously detected voice events, finding identical strings in the letter sequences by comparing the letter sequences in a pair-wise manner, and qualifying each identical string of each type according to presence probability and length of the identical string.

2. The method as claimed in claim 1, wherein said voice event detection method at least includes:
   performing voice endpoint detection on said captured voice signals to obtain a plurality of voice segments;
   capturing at least a characteristic parameter of each of said plurality of voice segments; and
   comparing said at least a characteristic parameter with pre-stored characteristic parameters for voice signal comparison to determine a corresponding voice event type.

3. The method as claimed in claim 1, wherein said method further includes an abnormal behavior decision method to continuously determine whether said latest behavior is an abnormal behavior or not, wherein a behavior consists of a single voice event, or two or more voice events.

4. The method as claimed in claim 1, wherein said behavior trajectory building method at least includes:
   naming said detected voice events with letters to obtain a plurality of letter sequences representing said detected voice events;
   comparing pair-wise said plurality of letter sequences to find at least an identical string;
   computing presence probability and length of said at least an identical string and setting thresholds for said probability and said length to obtain at least a qualified pre-selected string;
   classifying said at least a pre-selected string into a plurality of types, with each type representing a behavior type, by using a classification algorithm; and
   inducing said at least a qualified pre-selected string of each type to build a behavior trajectory.

5. The method as claimed in claim 1, wherein said voice event detection method further includes detection of time and location of said at least a voice event and recording the time and location of said at least a voice event.

6. The method as claimed in claim 5, wherein the location of said at least a voice event is within a closed living space.

7. The method as claimed in claim 1, wherein a voice able to trigger an emergency event is a human meaningless involuntary voice or a meaningful voice indicating a human bumping into wall, floor or other objects.

8. A method for building a behavior trajectory, comprising:
   continuously detecting voice events by integrating captured voice signals and other sensed signals using a voice event detection method and continuously recording the detected voice events;
   naming the detected voice events with letters to obtain a plurality of letter sequences representing the detected voice events;
   comparing pair-wise said plurality of letter sequences to find at least one identical string;
   computing presence probability and length of said at last one identical string and setting thresholds for the probability and length to obtain at least a qualified pre-selected string;
   classifying said at least a pre-selected string into a plurality of types, with each type representing a behavior type, by using a classification algorithm; and
   inducing said at least a qualified pre-selected string of each type to build a behavior trajectory;
   wherein detecting a latest behavior through latest continuous voice events and comparing said latest behavior with a history of said behavior trajectory; and
   issuing a notification alarm message when an abnormal behavior is detected.

9. The method as claimed in claim 8, wherein said voice event detection method classifies a plurality of captured voice signals into at least one voice event.

10. An alarm system based on voice events, said system comprising:
    a signal sensor for capturing one or more voice signals and sensing other sensed signals externally inputted, outputting the captured voice signals and the other sensed signals and recording locations of the captured voice signals and the other sensed signals;
    a voice event detector connected to said signal sensor, for determining a plurality of corresponding voice events based on said locations and at least a characteristic parameter of the captured voice signals and the other sensed signals; and a notice and alarm element connected to said voice event detector, for executing notification and alarming functions based on a behavior trajectory of said plurality of corresponding voice events;

wherein said system includes a behavior trajectory building module for generating said behavior trajectory through a behavior trajectory building method after accumulating a sufficient number of the voice events based on classifying qualified pre-selected strings of letters into a plurality of behavior types for building said behavior trajectory, said qualified pre-selected strings of letters being determined by naming each of the voice events with a letter to form letter sequences for continuously detected voice events, finding identical strings in the letter sequences by comparing the letter sequences in a pair-wise manner, and qualifying each identical string of each type according to presence probability and length of the identical string.

11. The system as claimed in claim 10, wherein a behavior consists of a single voice event or two or more voice events.

12. The system as claimed in claim 10, wherein said system further includes an abnormal behavior decision module for continuously detecting a latest behavior, comparing against a history of said behavior trajectory, and issuing an abnormal behavior alarm when detecting an abnormal behavior.

13. The system as claimed in claim 10, wherein said system is integrated with a toilet, and said signal sensor further captures a pressure signal and a switch signal triggered by a flushing switch or seat of said toilet.

14. The system as claimed in claim 10, wherein said system is integrated with a bed mattress, and said signal sensor further captures a pressure signal, a switch signal, a temperature signal humidity signal or a physiological signal triggered by a human or objects on said bed mattress.

15. The system as claimed in claim 10, wherein said system is integrated with a ceiling, and said signal sensor further captures at least an ultrasonic distance-measuring signal from an ultrasonic distance-measuring device installed on said ceiling.

16. The system as claimed in claim 10, wherein said system is integrated with a faucet, and said signal sensor further captures a pressure signal or a switch signal triggered by a switch of said faucet.

17. The system as claimed in claim 10, wherein said system is integrated with a wheelchair, and said signal sensor further captures a pressure signal or a switch signal triggered by a cushion, wheel or brake switch of said wheelchair.

18. The system as claimed in claim 10, wherein said system is integrated with a door or a window, and said signal sensor further captures a pressure signal or a switch signal triggered by opening and closing said door or said window.

19. The system as claimed in claim 10, wherein a voice able to trigger an emergency event is a human meaningless involuntary voice or a meaningful voice indicating a human bumping into wall, floor or other objects.

20. The system as claimed in claim 10, wherein said voice event is an ordinary voice event or an emergency event.

21. The system as claimed in claim 10, wherein said system is installed in a living space chosen from a group consisting of bathroom, hospital room, household bedroom and living room.

22. The system as claimed in claim 20, wherein said emergency event is a pre-defined event selected from the events triggered by the voices of falling during getting on or off a bed, falling during getting on or off a wheelchair, being tripped or slipping when walking, choking when drinking, temporarily stopping breathing, fighting or having an argument, crying or moaning, calling or calling for help, sudden illness attack, wrecking, breaking or falling objects, being unable to finish the use of a toilet, and entering a dangerous zone.

23. The system as claimed in claim 20, wherein said ordinary voice event is an event selected from the events triggered by the voices of walking or movement, getting on or off bed, getting on or off a wheelchair, opening or closing a door, using a faucet, using a toilet, flushing a toilet, and drinking water.

* * * * *